United States Patent
Sato (10) Patent No.: US 9,778,803 B2
(45) Date of Patent: Oct. 3, 2017

(54) PORTABLE ELECTRONIC DEVICE

(71) Applicant: Japan Display Inc., Tokyo (JP)

(72) Inventor: Toshihiro Sato, Tokyo (JP)

(73) Assignee: Japan Display Inc., Tokyo (JP)

( * ) Notice: Subject to any disclaimer, the term of this patent is extended or adjusted under 35 U.S.C. 154(b) by 66 days.

(21) Appl. No.: 14/704,615

(22) Filed: May 5, 2015

(65) Prior Publication Data

US 2015/0324056 A1 Nov. 12, 2015

(30) Foreign Application Priority Data

May 12, 2014 (JP) ................................. 2014-098917

(51) Int. Cl.
*G06F 3/045* (2006.01)
*G06F 3/044* (2006.01)
*G06F 3/041* (2006.01)
*G06F 1/16* (2006.01)

(52) U.S. Cl.
CPC .............. *G06F 3/044* (2013.01); *G06F 1/169* (2013.01); *G06F 1/1626* (2013.01); *G06F 1/1643* (2013.01); *G06F 3/045* (2013.01); *G06F 3/0412* (2013.01); *G06F 3/0416* (2013.01); *G06F 2203/0339* (2013.01); *G06F 2203/04102* (2013.01); *G06F 2203/04105* (2013.01); *G06F 2203/04111* (2013.01)

(58) Field of Classification Search
None
See application file for complete search history.

(56) References Cited

U.S. PATENT DOCUMENTS

| | | | | |
|---|---|---|---|---|
| 2009/0273572 | A1* | 11/2009 | Edwards | G06F 3/044 345/173 |
| 2011/0310488 | A1* | 12/2011 | Tomotoshi | G02F 1/133308 359/601 |
| 2013/0215060 | A1* | 8/2013 | Nakamura | G06F 1/1626 345/173 |
| 2013/0300668 | A1* | 11/2013 | Churikov | G06F 3/041 345/168 |
| 2013/0300697 | A1* | 11/2013 | Kim | G06F 1/1626 345/173 |
| 2013/0308076 | A1 | 11/2013 | Yasumatsu | |
| 2014/0022202 | A1* | 1/2014 | Badaye | G06F 3/044 345/174 |
| 2015/0015526 | A1* | 1/2015 | Wang | G06F 3/044 345/174 |

FOREIGN PATENT DOCUMENTS

WO 2012042822 A1 4/2012

* cited by examiner

*Primary Examiner* — Ifedayo Iluyomade
(74) *Attorney, Agent, or Firm* — Typha IP LLC (57) ABSTRACT

An erroneous operation is made less likely to occur in a portable electronic device including a touch panel. The portable electronic device has a plate-like external shape. An organic EL display panel that displays an image on a display surface is disposed on one surface of the external shape. A touch sensor is disposed on the display surface and detects contact of an object with the display surface. As the touch sensor, a capacitive contact sensor is disposed in a main area of the display surface that is set to include a central portion, and a resistive contact sensor is disposed in a side area of the display surface that includes at least a portion of an edge of the display surface and is set exclusively of the main area.

12 Claims, 8 Drawing Sheets

PORTABLE ELECTRONIC DEVICE

CROSS-REFERENCE TO RELATED APPLICATION

The present application claims priority from Japanese application JP2014-098917 filed on May 12, 2014, the content of which is hereby incorporated by reference into this application.

BACKGROUND OF THE INVENTION

1. Field of the Invention

The present invention relates to a portable electronic device, and particularly to a device including a touch panel and operated by a user holding the device with his/her hand.

2. Description of the Related Art

A touch panel obtained by combining a flat panel display with a touch sensor is mounted on various types of portable electronic devices. As for the flat panel display, for example, a flexible display using a resin film for a substrate has been developed in recent years. The flexible display can be made thinner and lighter than a flat panel display using a glass substrate, and allows to obtain a display surface with a curved surface shape. The types of the touch sensor include a capacitive type and a resistive type. The capacitive touch sensor can sense a finger before the finger contacts a sensor surface, so that quick operability is obtained. On the other hand, the resistive touch sensor is of a pressure-sensitive type that detects a finger based on a pressure applied by the finger to a sensor surface.

SUMMARY OF THE INVENTION

In the portable electronic device that is used by a user holding it with his/her hand, such as a smartphone or a tablet terminal, the holding hand or finger may unintentionally touch a display surface of a display. When the capacitive touch sensor is located at a position to be touched by the holding hand or a position likely to be touched, the touch sensor detects an operation not intended by the user, and thus an erroneous operation may occur in the portable electronic device.

The invention provides a portable electronic device that is less likely to cause the erroneous operation and whose operability is improved.

(1) A portable electronic device according to an aspect of the invention is a device having a plate-like external shape. The portable electronic device includes: a display unit that displays an image on a display surface disposed on one surface of the external shape; and a contact sensor that is disposed on the display surface and detects contact of an object with the display surface, wherein as the contact sensor, a capacitive contact sensor is disposed in a main area of the display surface that is set to include a central portion, and a pressure-sensitive contact sensor is disposed in a side area of the display surface that includes at least a portion of an edge of the display surface and is set exclusively of the main area.

(2) In the portable electronic device according to (1), the display surface in the side area may be a curved surface whose cross-sectional shape in a direction intersecting the edge is a convex curved line.

(3) In the portable electronic device according to (2), the display surface in the main area may be a flat surface, and an antireflection film to make an external light reflectance lower than that in the main area may be disposed in the side area.

(4) A portable electronic device according to another aspect of the invention is a device having a plate-like external shape. The portable electronic device includes: a display unit that displays an image on a display surface disposed on one surface of the external shape; a display surface contact sensor that is composed of a capacitive contact sensor disposed on the display surface; and a rear surface contact sensor that is composed of a pressure-sensitive contact sensor disposed in an edge area that is set adjacent to at least a portion of an edge of the other surface of the external shape.

(5) In the portable electronic device according to (4), the external shape in the edge area may have a curved surface whose cross-sectional shape in a direction intersecting the edge is a convex curved line.

(6) In the portable electronic device according to (4), the portable electronic device may further include a control unit that obtains a pointed position on the display surface with the display surface contact sensor and the rear surface contact sensor, and the control unit may associate a contact position detected by the rear surface contact sensor with a position on the display surface, the position being opposed to the contact position.

DETAILED DESCRIPTION OF THE INVENTION

Hereinafter, embodiments of the invention will be described based on the drawings.

The disclosure is illustrative only. Appropriate modifications that will readily occur to those skilled in the art and fall within the gist of the invention are of course included in the scope of the invention. In the drawings, the width, thickness, shape, and the like of each part may be schematically represented, compared to those in practicing aspects of the invention, for more clarity of description. However, they are illustrative only, and do not limit the interpretation of the invention. Moreover, in the specification and the drawings, elements similar to those described in relation to a previous

First Embodiment

A portable electronic device 2 according to a first embodiment of the invention is, for example, a smartphone, a tablet terminal, or the like. The portable electronic device 2 has a substantially plate-like external shape, and has a size and a weight that allow a user to use the portable electronic device 2 while, for example, holding the portable electronic device 2 with one hand or both hands. The plate-like external shape has two main surfaces. Hereinafter, one surface of the main surfaces, on which a display surface of the portable electronic device 2 is provided, is referred to as a front surface, while the other surface located on the back side of the front surface is referred to as a rear surface.

Figure 1:
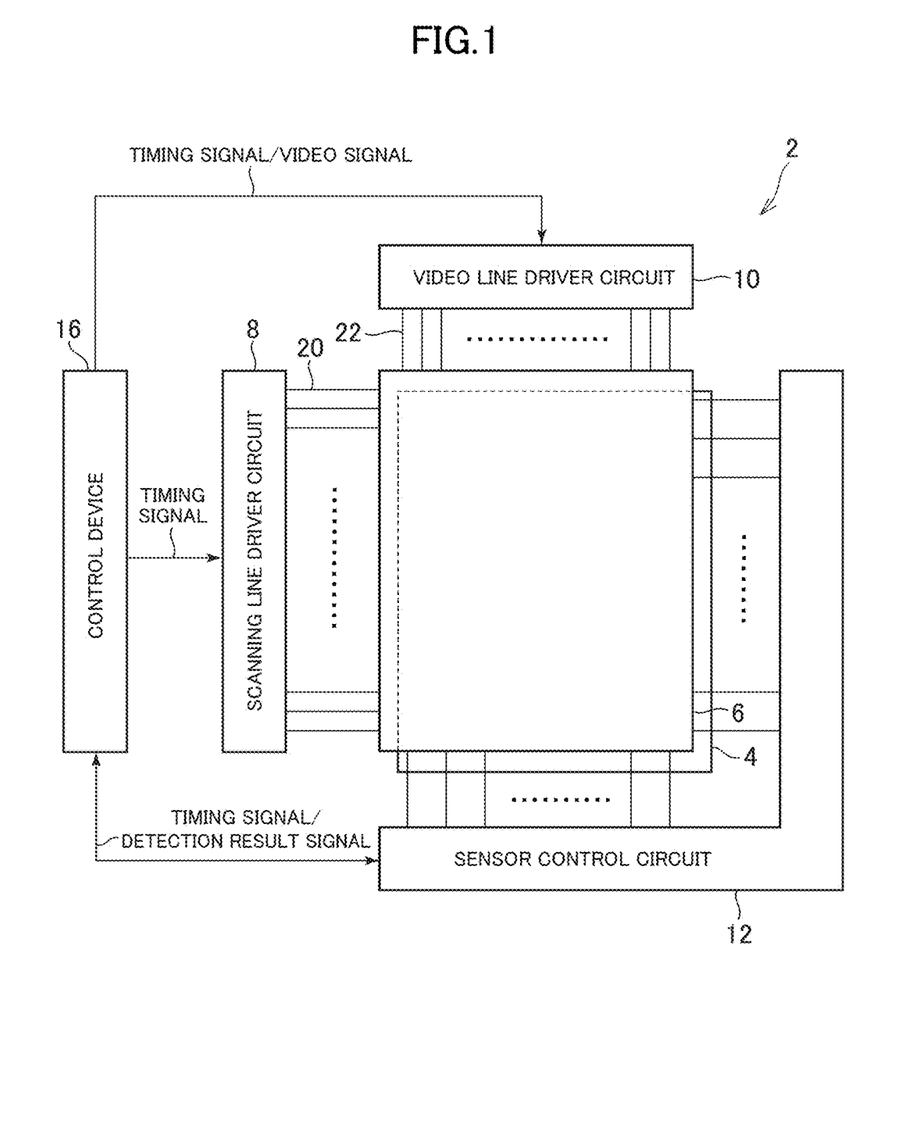
FIG. 1 is a schematic view showing a schematic configuration of a portable electronic device according to a first embodiment of the invention.

FIG. 1 is a schematic view showing a schematic configuration of the portable electronic device 2. As shown in FIG. 1, the portable electronic device 2 includes an organic EL display panel 4, a touch sensor 6, a scanning line driver circuit 8, a video line driver circuit 10, a sensor control circuit 12, and a control device 16.

The organic EL display panel 4 is a display unit that displays an image on the display surface. As described above, the display surface is disposed on the front surface of the portable electronic device 2. The organic EL display panel 4 includes a pixel array unit in which organic light-emitting diodes (OLEDs) and pixel circuits are disposed in a matrix corresponding to the display surface. The pixel circuit is configured to include a plurality of thin film transistors (TFTs) and a capacitor. The OLEDs and the pixel circuits are formed on a sheet-like base material. In the embodiment, the organic EL display panel 4 is a flexible display, so that the pixel array unit is bendable. Specifically, as a base material (TFT substrate) to form the OLEDs of the organic EL display panel 4, or a base material (sealing substrate) disposed to face the TFT substrate with the OLEDs therebetween, a flexible material such as a resin film, for example, is used. The organic EL display panel 4 may be made flexible by, after making the structure of the organic EL display panel 4 using a glass substrate as the TFT substrate or the sealing substrate, thinning the TFT substrate or the sealing substrate through polishing or the like.

Moreover, the organic EL display panel 4 includes a drive unit that drives the pixel array unit. The drive unit includes the scanning line driver circuit 8, the video line driver circuit 10, and the control device 16, and drives the pixel circuit to control light emission of the OLED.

The scanning line driver circuit 8 is connected to scanning signal lines 20 each provided for each of lines (pixel rows) of pixels in the horizontal direction in the pixel array unit. The scanning signal line 20 is connected to gates of lighting TFTs provided in the pixel circuits of the corresponding pixel row. The scanning line driver circuit 8 sequentially selects the scanning signal line 20 in response to a timing signal input from the control device 16, and applies a voltage to turn on the lighting TFT to the selected scanning signal line 20.

The video line driver circuit 10 is connected to video signal lines 22 each provided for each of lines (pixel columns) of pixels in the vertical direction. The video line driver circuit 10 receives a video signal from the control device 16, and outputs, in synchronizing with the selection of the scanning signal line 20 by the scanning line driver circuit 8, a voltage according to the video signal of the selected pixel row to each of the video signal lines 22. The voltage is written to the capacitor of the pixel circuit via the lighting TFT in the selected pixel row. The pixel circuit supplies the OLED with a current according to the voltage written to the capacitor, whereby the OLED emits light at an intensity according to the video signal.

The touch sensor 6 (contact sensor) is disposed on the display surface of the organic EL display panel 4 and detects contact of an object with the display surface. As the touch sensor 6, a capacitive contact sensor is disposed in a main area that is set to include the central portion of the display surface, and a resistive contact sensor as a pressure-sensitive contact sensor is disposed in a side area that includes at least a portion of an edge of the display surface and is set exclusively of the main area.

Figure 2:
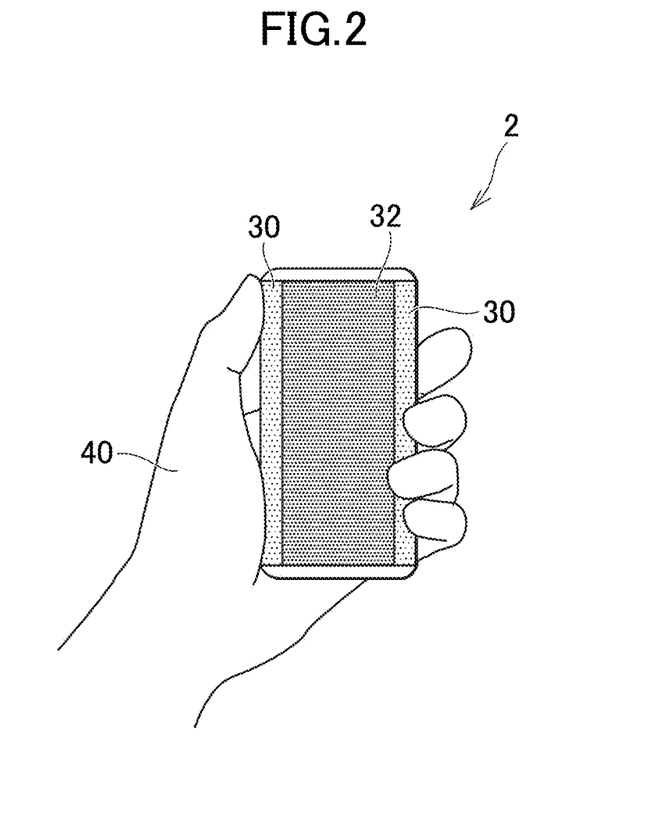
FIG. 2 is a schematic view showing the portable electronic device according to the first embodiment of the invention in a state of being held by a user.

FIG. 2 is a schematic view of the display surface of the portable electronic device 2. FIG. 2 illustrates the portable electronic device 2 in a state of being held by a user. The direction of the planar shape of the portable electronic device 2 shown in FIG. 2 is the same as that of FIG. 1, and the left and right direction of the portable electronic device 2 in FIG. 2 corresponds to the pixel row direction described above, or the horizontal direction.

In the embodiment, a side area 30 is set on left and right sides of the display surface. The left side area 30 is set so as to include an entire left edge of the display surface having a rectangular shape. The right side area 30 is set so as to include an entire right edge of the display surface. The left side area 30 is an area corresponding to predetermined pixel columns from a left edge of the pixel array unit. The right side area 30 is an area corresponding to predetermined pixel columns from a right edge of the pixel array unit. On the other hand, a main area 32 is the remaining area of the display surface interposed between the side areas 30. For example, the widths of the side areas 30 can be set to be the same as each other. Moreover, the width of the main area 32 is basically set larger than the width of each of the side areas 30. In the embodiment, the width of the main area 32 is set larger than the sum of the widths of the side areas 30.

In the embodiment, the resistive contact sensor disposed in the side area 30 is of a digital matrix resistive type, while the capacitive contact sensor disposed in the main area 32 is of a projected capacitive type. Therefore, the touch sensor 6 includes, in both the side areas 30 and the main area 32, a plurality of horizontal electrodes that extend in the horizontal direction and are disposed in parallel in the vertical direction, and a plurality of vertical electrodes that extend in the vertical direction and are disposed in parallel in the horizontal direction.

The resistive contact sensor includes fixed electrodes and movable electrodes. The fixed electrode is fixed on the display surface, and the movable electrode is disposed above the fixed electrode. A gap is provided between the fixed electrode and the movable electrode. The movable electrode is displaced by a contact pressure of an object, thereby being able to contact the fixed electrode. For example, the fixed electrode is formed as the horizontal electrode in the side area 30, and the movable electrode is formed as the vertical electrode therein.

The projected capacitive contact sensor includes drive electrodes and sense electrodes. The drive electrodes and the sense electrodes are disposed orthogonal to each other. For example, the drive electrode is formed as the horizontal electrode in the main area 32, and the sense electrode is formed as the vertical electrode therein.

Under the control of the control device 16, the sensor control circuit 12 inputs an electric signal to the touch sensor 6, senses an electrical output signal from the touch sensor 6, and outputs the sense result to the control device 16. For example, the sensor control circuit 12 detects, in the side area 30, electrical conduction occurring between the horizontal electrode and the vertical electrode that intersect each other at a contact position of the object. Based on the set of the horizontal electrode and the vertical electrode that are electrically conducting to each other, the contact position of the object can be specified. Moreover, the sensor control circuit 12 inputs, in the main area 32, for example an AC signal such as a rectangular pulse to the drive electrode, and detects an electric signal generated in each of the sense electrodes. A voltage change occurring in the sense electrode due to capacitive coupling between the sense electrode and the drive electrode differs between a position at which the object contacts the display surface and a position at which the object does not contact the display surface. Therefore, by sequentially selecting the drive electrode and applying the AC signal thereto, the set of the drive electrode and the sense electrode corresponding to the contact position can be specified.

The control device 16 (control unit) includes an arithmetic processing circuit such as a central processing unit (CPU), and a memory such as a read only memory (ROM) or a random access memory (RAM). The control device 16 executes various kinds of processing with the CPU reading and executing programs stored in the memory. Specifically, the control device 16 generates a video signal indicating the gray-scale values of the pixels, and outputs the video signal to the video line driver circuit 10. Moreover, the control device 16 generates, based on video data, a timing signal for establishing synchronization among the scanning line driver circuit 8, the video line driver circuit 10, and the sensor control circuit 12, and outputs the timing signal to the circuits. Moreover, the control device 16 obtains the contact position of the object on the display surface based on the detection result of the sensor control circuit 12.

As shown in FIG. 2, the portable electronic device 2 has a plate-like external shape with a substantially rectangular planar shape, and the width along the short side of the rectangle has, for example, a size allowing the user to grasp the portable electronic device 2 with one hand 40. In FIG. 2, the user holds the portable electronic device 2 with the palm of the hand placed on the rear surface of the portable electronic device 2 and with the fingers placed on left and right side surfaces or a front surface of the portable electronic device 2. In the embodiment, the display surface of the organic EL display panel 4 is designed as large as possible within the planar shape of the portable electronic device 2, and the display surface is disposed over the substantially entire portable electronic device 2 in the left and right direction.

The user can operate the portable electronic device 2 by touching the touch sensor 6 with, for example, his/her finger of the other hand. Moreover, an area that the user's fingers grasping the portable electronic device 2 reach is present at an edge of the display surface, so that the user can also touch the touch sensor 6 in the area with his/her finger of the grasping hand to operate the portable electronic device 2. The capacitive contact sensor easily senses even the finger just lightly placed for grasping. On the other hand, the resistive contact sensor is basically less likely to sense the finger of the grasping hand compared to the capacitive contact sensor. Moreover, the resistive contact sensor 46 can be designed such that the resistive contact sensor 46 does not sense the finger of the grasping hand but senses the finger with which the user consciously presses for operation.

Therefore, by setting the side area 30 in which the resistive contact sensor is disposed corresponding to the range within which the user's fingers grasping the portable electronic device 2 are touchable, it becomes easy for the user to hold the portable electronic device 2 with his/her fingers placed on the edge portion of the display surface so as not to be detected by the touch sensor 6.

Figure 3:
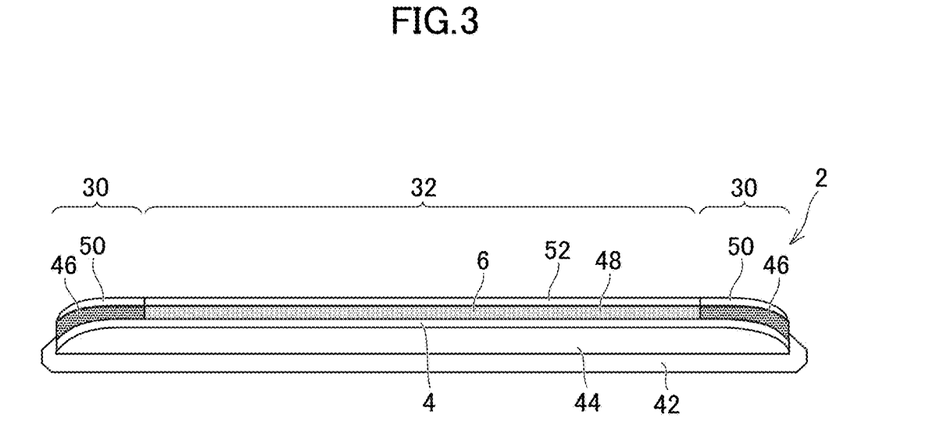
FIG. 3 is a schematic vertical sectional view of the portable electronic device according to the first embodiment of the invention.

FIG. 3 is a schematic vertical sectional view of the portable electronic device 2 along the horizontal direction in the display surface. The organic EL display panel 4, the touch sensor 6, the various types of circuits, and the like are integrally combined together using a case 42 (housing). The case 42 is basically located on the rear surface of the portable electronic device 2, while the organic EL display panel 4 and the touch sensor 6 are disposed on the front surface of the portable electronic device 2. Moreover, a built-in unit 44 is stored between the organic EL display panel 4 and the case 42. The built-in unit 44 is composed of a structure to support a rear surface of the organic EL display panel 4, an electronic circuit board, a battery, and the like.

As shown in FIG. 3, the organic EL display panel 4 can be disposed such that the display surface has a convex shape. For example, the display surface in the side area 30 is formed into a curved surface whose cross-sectional shape shown in FIG. 3 is a convex curved line. On the other hand, the display surface in the main area 32 is formed into a flat surface.

The edge portion of the front surface of the portable electronic device 2, on which the fingers of the grasping hand are placed, is formed into a convex-shaped curved surface, so that it is easy for the user to grasp the portable electronic device 2 with his/her hand and operate the touch sensor 6 with the finger of the grasping hand. Since a portion of the display surface edge portion formed into the curved surface is a portion with which the finger of the grasping hand is likely to come in contact, the portion is set as the side area 30 and the resistive contact sensor 46 is disposed therein. With this configuration, it is possible to reduce an erroneous operation of the touch sensor 6 by the finger of the hand holding the portable electronic device 2. On the other hand, the capacitive contact sensor 48 is disposed in the main area 32 with which the finger of the grasping hand is less likely to come in contact, thereby enabling a quick operation.

In the side area 30, an antireflection film 50 to make an external light reflectance lower than that in the main area 32 is disposed. For example, in the embodiment, a cover glass or the like is disposed as a display surface protective film 52 in the main area 32, but the antireflection film is not disposed therein. On the other hand, the antireflection film 50 is disposed in the side area 30. Even when the user changes the direction of the portable electronic device 2 so as to prevent reflection of external light in the main area 32, high reflection of external light occurs somewhere in the side area 30 as a curved surface, and thus a problem may occur in which it is hard to see the display of the organic EL display panel 4. The problem can be avoided by providing the antireflection film 50. For example, a moth-eye type non-reflective film on the surface of which a micro-relief structure equal to or less than the wavelength of light is fabricated can be used as the antireflection film 50.

The moth-eye type non-reflective film is easily scratched in removing of dirt or the like, and relatively expensive as well. Therefore, the moth-eye type non-reflective film is not disposed in the main area 32 of the embodiment, and the main area 32 is covered with a material such as a cover glass from which the dirt is relatively easily removed and which is relatively inexpensive. With this configuration, it becomes easy to maintain the display visibility of the main area 32 that is located in the central portion of the display surface and occupies a large area. As the display surface protective film 52 of the main area 32, an antireflection film that does not have the same antireflection performance as the moth-eye type non-reflective film but is easy to be cleaned may be disposed.

Figure 4:
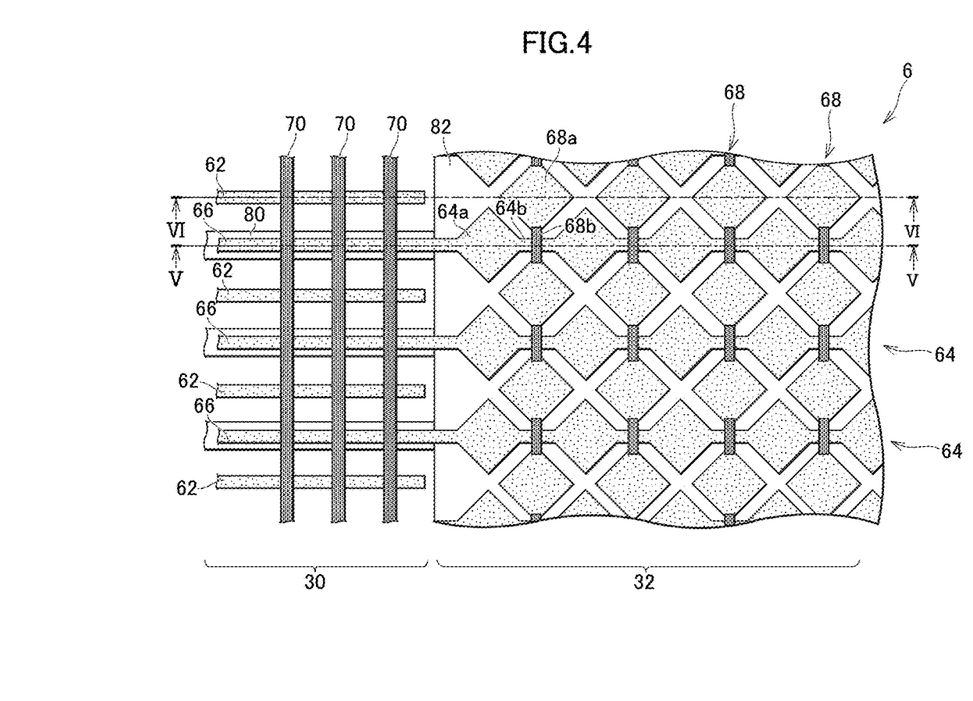
FIG. 4 is a schematic partial plan view of a touch sensor mounted on the portable electronic device according to the first embodiment of the invention.
Figure 5:
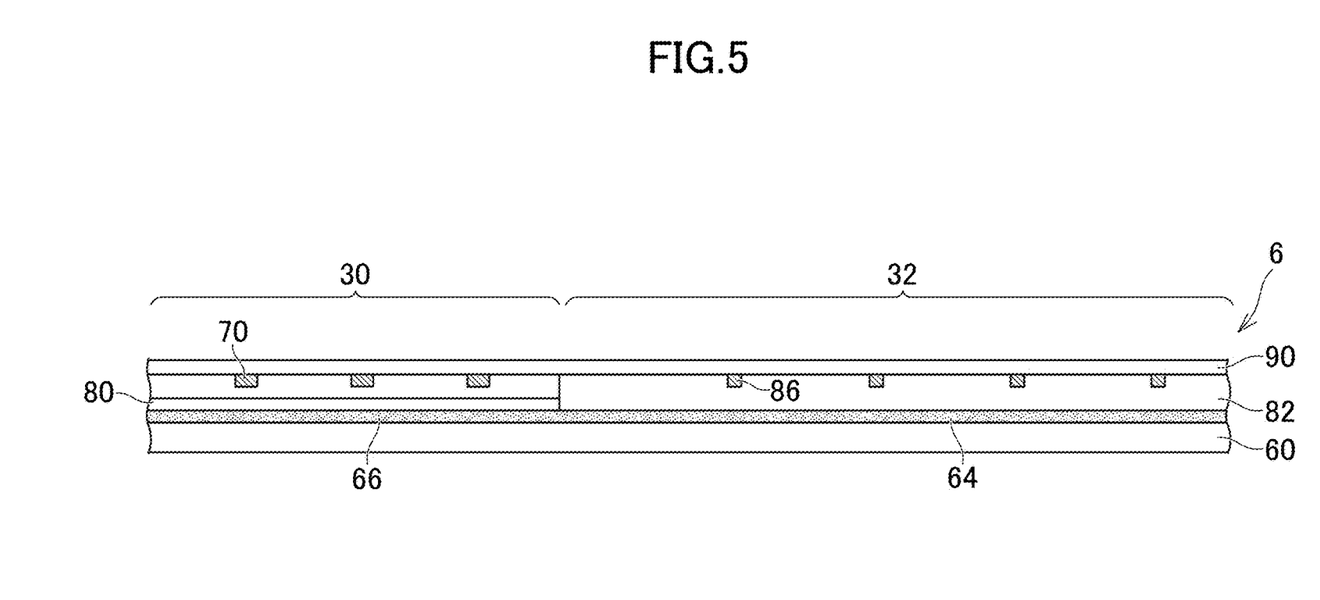
FIG. 5 is a schematic vertical sectional view of the touch sensor taken along the line V-V shown in FIG. 4.
Figure 6:
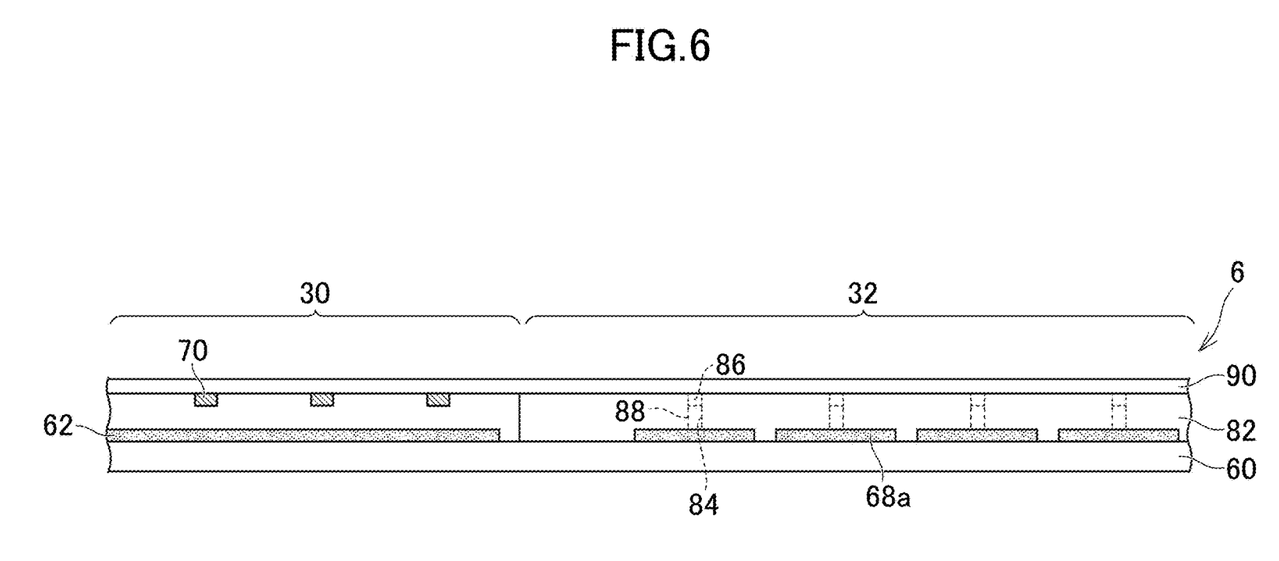
FIG. 6 is a schematic vertical sectional view of the touch sensor taken along the line VI-VI shown in FIG. 4.

FIG. 4 is a schematic partial plan view of the touch sensor 6, showing an area across the side area 30 and the main area 32 in the display surface. FIG. 5 represents a schematic vertical section of the touch sensor 6 along the line V-V in the horizontal direction shown in FIG. 4. FIG. 6 represents a schematic vertical section of the touch sensor 6 along the line VI-VI in the horizontal direction shown in FIG. 4. FIGS. 5 and 6 show an example in which the touch sensor 6 is of an on-cell type in which the touch sensor 6 is disposed on the sealing substrate of the organic EL display panel 4.

Fixed electrodes 62 included in the resistive contact sensor 46, and drive electrodes 64, lead wirings 66 of the drive electrodes 64, and pad portions 68a of sense electrodes 68, all included in the capacitive contact sensor 48, are formed of a transparent conductive film on a surface of a transparent and insulating first base material 60.

The drive electrodes 64 and the fixed electrodes 62 are the plurality of horizontal electrodes that extend in the horizontal direction and are disposed in parallel in the vertical direction, as has been already described.

Specifically, each of the drive electrodes 64 is formed in the main area 32, and composed of a plurality of pad portions 64a and bridge portions 64b each connecting the pad portions 64a together. The plurality of pad portions 64a basically have a rhombic shape of the same size and shape, and are disposed such that diagonals of the rhombic shapes lie on a straight line in the horizontal direction. The pad portions 64a adjacent to each other are connected with the bridge portion 64b between facing vertices of the rhombic shapes.

The lead wiring 66 is basically formed linearly, and connected from an end of the drive electrode 64 on the side area 30 side across the side area 30 in the horizontal direction to a terminal disposed outside the side area 30.

The fixed electrodes 62 are formed in the side area 30. Each of the fixed electrodes 62 has a straight strip shape, and is disposed in an area between the lead wirings 66 arranged in parallel in the vertical direction in the side area 30. One end of the fixed electrode 62 is connected to a terminal disposed outside the side area 30.

The lead wiring 66 is covered with an insulating film 80 for preventing a short circuit between the lead wiring 66 and movable electrodes 70. On the other hand, the fixed electrode 62 is not covered with the insulating film 80, so that the fixed electrode 62 can electrically contact the movable electrode 70 displaced by contact with an object.

The sense electrodes 68 are the plurality of vertical electrodes that extend in the vertical direction and are disposed in parallel in the horizontal direction, as has been already described, and are disposed in the main area 32. Specifically, the pad portions 68a basically have a rhombic shape of the same size and shape, and are disposed, with one diagonal directed in the vertical direction, alternately with the pad portion 64a in a gap between the drive electrodes 64. The pad portion 68a is disposed at a position at which an extension of the diagonal in the vertical direction intersects the bridge portion 64b of the drive electrode 64. Each of the sense electrodes 68 is composed of the plurality of pad portions 68a arranged in the vertical direction and bridge portions 68b each connecting the pad portions 68a together.

The bridge portion 68b is formed using a conductive material that is formed in a different layer from the drive electrode 64 and the pad portion 68a for avoiding a short circuit between the bridge portion 68b and the bridge portion 64b of the drive electrode 64. For example, an insulating film 82 is stacked in the main area 32 of the first base material 60 on which the fixed electrodes 62, the drive electrodes 64, the lead wirings 66, and the pad portions 68a of the sense electrodes 68 are formed. A contact hole 84 is formed at a connecting position of the pad portion 68a and the bridge portion 68b in the insulating film 82. For example, the bridge portion 68b connects together a pair of facing vertices of the rhombic shapes of the pad portions 68a adjacent to each other in the vertical direction, and the contact hole 84 is formed in the vicinity of each of the vertices. A conductive material (transparent conductive film or metal film) is stacked on a surface of the insulating film 82 in which the contact holes 84 are formed, and the bridge portion 68b is formed using the conductive material. Specifically, the bridge portion 68b is composed of a thin wiring portion 86 connecting the contact holes 84 together on the surface of the insulating film 82 and embedded portions 88 in the contact holes 84. An end of the sense electrode 68 is connected to a terminal disposed outside the main area 32.

The movable electrodes 70 of the resistive contact sensor 46 are formed on a surface of a second base material 90 facing the first base material 60. The second base material 90 is disposed to face the first base material 60. The movable electrodes 70 are the plurality of vertical electrodes that extend in the vertical direction and are disposed in parallel in the horizontal direction, as has been already described, and are formed in the side area 30. Each of the movable electrodes 70 has a straight strip shape, and an end of the movable electrode 70 is connected to a terminal disposed outside the side area 30.

The second base material 90 on which the movable electrodes 70 are formed is bonded to the first base material 60 on which the fixed electrodes 62, the drive electrodes 64, and the sense electrodes 68 are formed. The electrodes 62, 64, 68, and 70 are connected to the sensor control circuit 12 via the terminals to which the electrodes are connected. The first base material 60 and the second base material 90 are formed of a flexible material, and the touch sensor 6 is configured to be flexible. Therefore, the touch sensor 6 can be disposed along the display surface forming a curved surface. Specifically, the touch sensor 6 is disposed on the display surface with the second base material 90 on which the movable electrodes 70 are provided upward.

The touch sensor 6 having the structure shown in FIGS. 4 to 6 can be disposed on the display surface with the first base material 60 upward, in which case the electrode 62 serves as a movable electrode and the electrode 70 serves as a fixed electrode.

A gap between the fixed electrode 62 and the movable electrode 70 can be adjusted with the thickness of the insulating film 82. When the resistive contact sensor 46 operates without any trouble even if the thickness of the insulating film 80 provided in the side area 30 is made the same as that of the insulating film 82 provided in the main area 32, the insulating films 80 and 82 can be formed in a common process. In this case, since two types of sensors can be manufactured as an integral structure using the same process, a touch sensor at a lower cost can be formed.

In the embodiment, the resistive contact sensor is used as a pressure-sensitive contact sensor provided in the side area 30. However, other pressure-sensitive contact sensors may be disposed in the side area 30. Moreover, the touch sensor 6 may be of an on-cell type in which electrodes are disposed on the sealing substrate of the organic EL display panel 4, or may be of an in-cell type in which electrodes are disposed inside the sealing substrate. The use of the sensor formed inside the substrate has an advantageous effect that a display panel with a sensor can be further thinned.

In the embodiment described above, the touch sensor 6 in which the resistive contact sensor 46 and the capacitive contact sensor 48 are integrally formed has been described. However, the resistive contact sensor 46 and the capacitive contact sensor 48 may be formed separately.

Moreover, the structure of the touch sensor 6 in which the resistive contact sensor 46 and the capacitive contact sensor 48 are integrally formed is not limited to that described above. For example, it is possible to employ a configuration in which the lead wiring 66 is used also as the fixed electrode 62. In this case, the insulating film 80 is not provided on the lead wiring 66. Then, the sensor control circuit 12 drives the resistive contact sensor 46 and the capacitive contact sensor 48 in a time division manner. The sensor control circuit 12 disconnects the movable electrode 70 from a power supply to bring the movable electrode 70 into a floating state at the time of sensing with the capacitive contact sensor 48 so that an AC signal is applied to the drive electrode 64 even if an object contacts the side area 30 and causes a short circuit between the movable electrode 70 and the lead wiring 66.

In the embodiment, the convex-shaped display surface is formed by forming the organic EL display panel 4 into a curved surface. However, it is also possible to form the convex-shaped display surface by disposing a transparent panel whose surface is a curved surface on the front surface of the organic EL display panel 4 having a flat surface.

In the embodiment, the main area 32 has a flat surface. However, the main area 32 may have a convex-shaped curved surface with a smaller curvature than that of the side area 30.

The side area 30 can be provided not only at the portions along the left and right edges of the display area but also, for example, at portions along the top and bottom edges.

Second Embodiment

In constituting elements of a portable electronic device 2a according to a second embodiment, constituting elements similar to those of the first embodiment are denoted by the same reference and numeral signs, and a description thereof is basically omitted. The structure shown in FIG. 1 in relation to the portable electronic device 2 of the first embodiment is basically common to the portable electronic device 2a, and therefore, FIG. 1 is cited for the portable electronic device 2a. Hereinafter, the portable electronic device 2a will be described mainly on differences from the portable electronic device 2.

Figure 7:
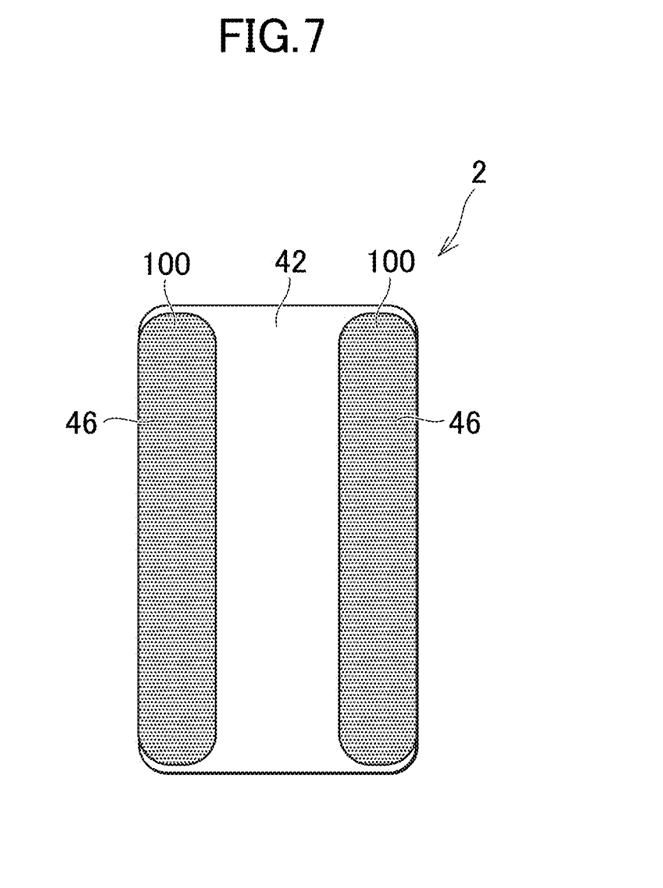
FIG. 7 is a schematic rear view of a portable electronic device according to a second embodiment of the invention.

FIG. 7 is a schematic view of a rear surface of the portable electronic device 2a. The portable electronic device 2a has a plate-like external shape with a substantially rectangular planar shape, and the width along the short side of the rectangle may have, for example, a size allowing the user to grasp the portable electronic device 2a with one hand like a smartphone, or may be larger than the size.

The capacitive contact sensor 48 is disposed as a display surface contact sensor on the display surface of the organic EL display panel 4 of the portable electronic device 2a. On the other hand, the resistive contact sensor 46 is disposed as a rear surface contact sensor in each edge area that is set adjacent to at least a portion of an edge of the rear surface of the portable electronic device 2a.

The user can operate the portable electronic device 2a by, for example, touching the touch sensor 6 on the display surface. Moreover, the user can operate the resistive contact sensor 46 provided on the rear surface with his/her finger of the hand holding the portable electronic device 2a. When the user grasps the portable electronic device 2a, the grasping hand easily touches the rear surface of the portable electronic device 2a, especially, the edge portion. Therefore, the touch sensor 6 to be disposed at the rear surface edge portion of the portable electronic device 2a is the resistive contact sensor 46, so that an erroneous operation is suppressed.

In the embodiment, as shown in FIG. 7, an edge area 100 is set on left and right sides of the rear surface. The left edge area 100 is set so as to include an entire left edge of the rear surface having a rectangular shape, while the right edge area 100 is set so as to include an entire right edge of the rear surface. For the touch sensor 6 of the embodiment, as an area in which the resistive contact sensor 46 is disposed, the edge area 100 is provided instead of the side area 30 of the first embodiment. Moreover, the main area 32 in which the capacitive contact sensor 48 described in the first embodiment is disposed corresponds to the entire display surface in the embodiment.

Figure 8:
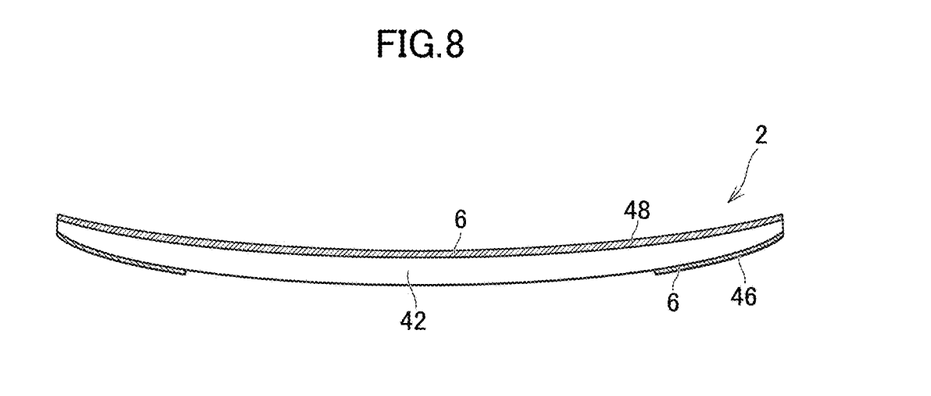
FIG. 8 is a schematic side view of the portable electronic device according to the second embodiment of the invention.

FIG. 8 is a schematic side view of the portable electronic device 2a, and the horizontal direction in FIG. 8 corresponds to the horizontal direction of the display surface. As shown in FIG. 8, the rear surface of the portable electronic device 2a is curved, and especially the rear surface in the edge area 100 is formed into a curved surface whose cross-sectional shape is a convex curved line.

The edge area 100 of the rear surface of the portable electronic device 2a, on which the grasping hand or finger is placed, is formed into a convex-shaped curved surface, so that the portable electronic device 2a is easily fit to the user's hand, and also the touch sensor 6 on the rear surface is easily operated with the finger of the grasping hand. Then, since the touch sensor 6 formed on the curved surface of the rear surface edge portion is a portion with which the grasping hand or finger is likely to come into contact, the resistive contact sensor 46 is disposed at the portion. With this configuration, it is possible to reduce an erroneous operation of the touch sensor 6 due to the hand holding the portable electronic device 2a.

On the other hand, the display surface of the portable electronic device 2a can be formed into a concave-shaped curved surface. In this case, a finger of the grasping hand is less likely to come into contact with the display surface. Therefore, the capacitive contact sensor 48 is disposed on the display surface, thereby enabling a quick operation. The touch sensor 6 at the edge portion of the display surface may be the resistive contact sensor 46 in the same manner as in the side area 30 of the first embodiment.

The control device 16 (control unit) obtains a position pointed to by the user with the touch sensors 6 on the display surface and the rear surface. For example, the control device 16 associates a contact position detected by the touch sensor 6 on the rear surface with a position that is on the display surface and opposed to the contact position. Specifically, the control device 16 moves a cursor displayed on the display surface in response to the contact position in the touch sensor 6 on the rear surface, or enables an icon displayed on the display surface to be operated by the touch sensor 6 on the rear surface.

Also in the embodiment, the various modifications described in the first embodiment are applicable.

Further, in the embodiments, the case where the display unit is the organic EL display panel has been illustrated as an example of the disclosure. However, as other application examples, all flat-panel type display devices, such as a liquid crystal display device, other self-luminous type display devices, an electronic paper type display device including an electrophoretic element, or a quantum dot type display device, can be mentioned. Moreover, it is needless to say that the invention can be applied without particular limitations on the size as long as the device is operated by the user holding the device with his/her hand.

Various altered and modified examples within the range of the idea of the invention will occur to those skilled in the art, and it is understood that the altered and modified examples also belong to the scope of the invention. For example, when those skilled in the art appropriately add or remove a constituting element or change the design of a constituting element in the embodiments described above, or add or omit a process or change the conditions of a process in the embodiments described above, those are included in the scope of the invention as long as they include the gist of the invention.

Moreover, it is understood that as to other operational effects brought about by the aspects described in the embodiments, an operational effect that is apparent from the description of the specification or that will appropriately occur to those skilled in the art is of course brought about by the invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A portable electronic device having a plate-like external shape, comprising: a display unit that displays an image on a display surface disposed on one surface of the external shape; a contact sensor that is disposed on the display surface, comprises a drive electrode and detects contact of an object with the display surface; a lead wiring that connects to an end of the drive electrode; and a terminal that connects to the lead wiring, wherein as the contact sensor, a capacitive contact sensor is disposed in a main area of the display surface that is set to include a central portion, and a pressure sensitive contact sensor is disposed in a side area of the display surface that includes at least a portion of an edge of the display surface and is set exclusively of the main area, the lead wiring is disposed from the end of the drive electrode on the side area to the terminal disposed outside the side area by crossing the side area; the capacitive contact sensor further comprises a sense electrode, the sense electrode comprises pad portions and a bridge portion formed using a different layer from the pad portions and connecting the pad portions together, and a longitudinal direction of the bridge portion is orthogonal to a longitudinal direction of the lead wiring in a plan view; wherein the display surface in the side area is a curved surface whose cross-sectional shape in a direction intersecting the edge is a convex curved line, and the lead wiring is curved along the curved surface, wherein the display surface in the main area is a flat surface, and an antireflection film to make an external light reflectance lower than that in the main area is disposed in the side area.

2. A portable electronic device having a plate-like external shape, comprising: a display unit that displays an image on a display surface disposed on one surface of the external shape; a display surface contact sensor that comprises a drive electrode and is composed of a capacitive contact sensor disposed on the display surface; a rear surface contact sensor that is composed of a pressure-sensitive contact sensor disposed in an edge area that is set adjacent to at least a portion of an edge of the other surface of the external shape; a lead wiring that connects to an end of the drive electrode; and a terminal that connects to the lead wiring, wherein the pressure-sensitive contact sensor is disposed only on the other surface of the external shape, the lead wiring is disposed from the end of the drive electrode on the display surface to the terminal disposed outside the edge area by crossing the edge area, the display surface contact sensor further comprises a sense electrode, the sense electrode comprises pad portions and a bridge portion formed using a different layer from the pad portions and connecting the pad portions together, and a longitudinal direction of the bridge portion is orthogonal to a longitudinal direction of the lead wiring in a plan view; wherein the display surface in the side area is a curved surface whose cross-sectional shape in a direction intersecting the edge is a convex curved line, and the lead wiring is curved along the curved surface, wherein the display surface in the main area is a flat surface, and an antireflection film to make an external light reflectance lower than that in the main area is disposed in the side area.

3. The portable electronic device according to claim 2, wherein
the external shape in the edge area has a curved surface whose cross-sectional shape in a direction intersecting the edge is a convex curved line.

4. The portable electronic device according to claim 2, further comprising a control unit that obtains a pointed position on the display surface with the display surface contact sensor and the rear surface contact sensor, wherein
the control unit associates a contact position detected by the rear surface contact sensor with a position on the display surface, the position being opposed to the contact position.

5. The portable electronic device according to claim 1, further comprising a movable electrode which is disposed in the side area, not in the main area, and crosses the lead wiring.

6. The portable electronic device according to claim 2, further comprising a movable electrode which is disposed in the edge area, not on the display surface, and crosses the lead wiring.

7. The portable electronic device according to claim 1, wherein
the drive electrode and the pad portions are formed of a same conductive film; and the bridge portion intersects the drive electrode in a plan view.

8. The portable electronic device according to claim 1, wherein
the pressure-sensitive contact sensor further comprises a movable electrode;
a longitudinal direction of the movable electrode is parallel to the longitudinal direction of the bridge portion in a plan view.

9. The portable electronic device according to claim 1, wherein
the bridge portion is formed of a metal film.

10. The portable electronic device according to claim 2, wherein
the drive electrode and the pad portions are formed of a same conductive film, and
the bridge portion intersects the drive electrode in a plan view.

11. The portable electronic device according to claim 2, wherein
   the pressure-sensitive contact sensor comprises a drive electrode and a movable electrode, and
   a longitudinal direction of the movable electrode is parallel to the longitudinal direction of the bridge portion in a plan view.

12. The portable electronic device according to claim 2, wherein
   the bridge portion is formed of a metal film.

\* \* \* \* \*